Nov. 29, 1966 J. TRINGALE ETAL 3,288,005
INDEXING ROTARY TOOL HOLDER
Filed July 9, 1964 4 Sheets-Sheet 1
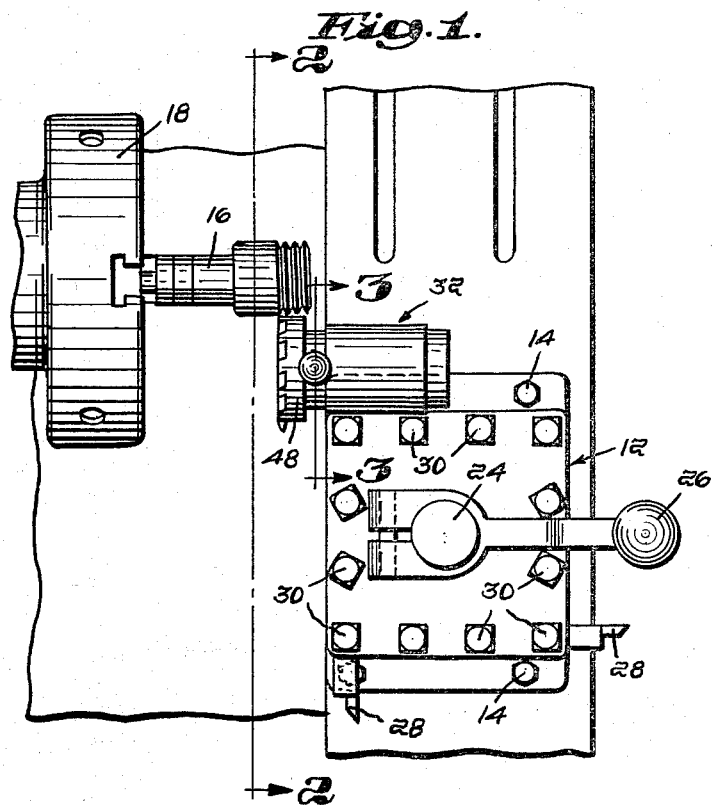
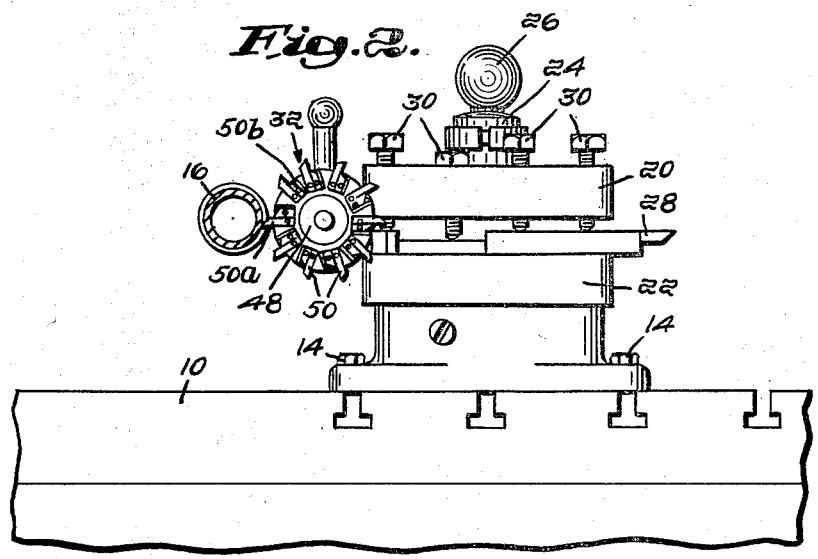
Inventors:
Joseph Tringale,
John A. Berberian,
by Russell, Chittick & Pfund Attorneys

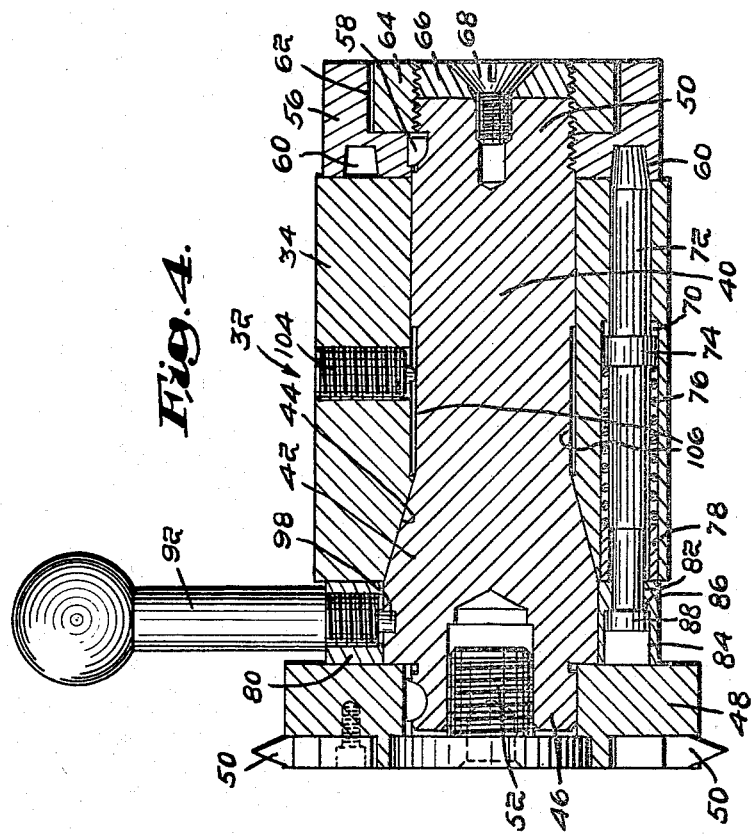

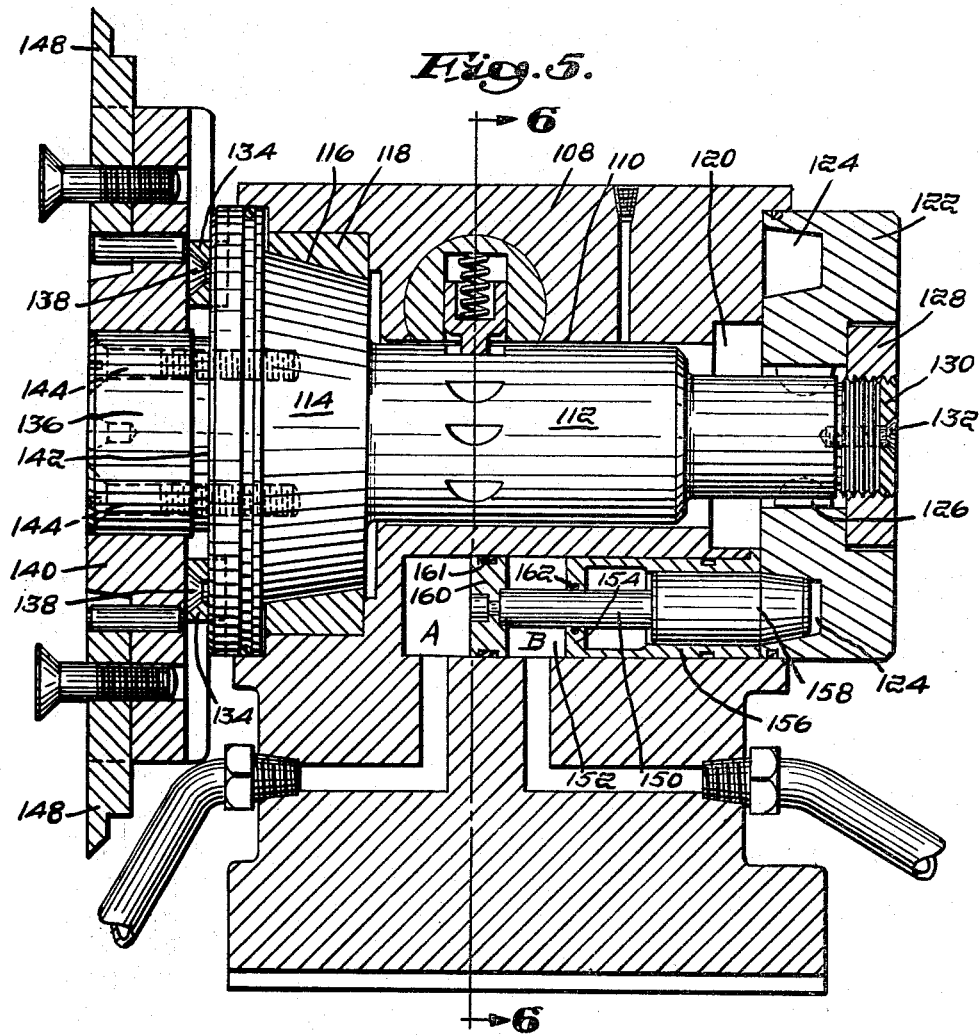

Inventors:
Joseph Tringale,
John A. Berberian,
by Russell, Chittick & Pfund
Attorneys

United States Patent Office 3,288,005
Patented Nov. 29, 1966

3,288,005
INDEXING ROTARY TOOL HOLDER
Joseph Tringale, 65 Sumner St., Medford, Mass., and John A. Berberian, Medford, Mass. (4 Elm Ave., Burlington, Mass.)
Filed July 9, 1964, Ser. No. 381,371
6 Claims. (Cl. 82—36)

This invention relates to machine tools, and more particularly to a means for sequentially positioning a plurality of individual tool members in an accurately indexed operative position adjacent a workpiece. More particularly, the invention is concerned primarily with machine tools such as lathes wherein a workpiece is rotated and subjected to a series of sequential operations requiring the use of a plurality of tool members.

Where workpieces are to be mass produced in large quantities, consecutive accurate positioning of each tool member during the machining operation is of primary importance if the desired tolerances and quality control standards are to be maintained. Moreover, when the tool members become worn, they must be efficiently and accurately replaced with newly-sharpened tools if the machining operation is to be carried on with a minimum loss of valuable production time. Still further, the number of tools capable of being operatively positioned adjacent the workpiece is also of prime importance, since this factor in turn governs the number of separate operations that may be sequentially performed on any one workpiece prior to removal thereof to another apparatus.

Tool holders of various types and designs have been developed in the past in an attempt to successfully incorporate the aforementioned desirable features. Although to some extent successful in partially attaining this goal, the prior art designs have failed to adequately satisfy the demands of the industry. More particularly, although some tool holders now in use provide means for mounting multiple tools, they lack accurate and quick-acting indexing means. This results in excessive time being consumed in both setting up and thereafter maintaining proper adjustment of the tools during actual operation. Other tools holders lack flexibility in that they accommodate only a minimum number of tools.

These difficulties have now been overcome in a novel manner by the present invention, a general object of which is to provide an improved tool holder of the rotary indexing type capable of being quickly and accurately adjusted when sequentially positioning a plurality of individual tool members in an operative position adjacent a workpiece.

Another object of the present invention is to provide an improved indexing means for use with a rotary tool holder of the type described.

A further object of the present invention is to provide an accurate indexing means capable of being either manually or automatically-operated when performing sequential operations on a workpiece.

Another object of the present invention is to provide means for accommodating a maximum number of individual tool members.

A further object of the present invention is to provide means for quickly and accurately replacing the tool members with sharpened and preset replacements without undue loss of production time.

These and other objects of the present invention will become more apparent as the description proceeds with the aid of the accompanying drawings in which:

FIG. 1 is a plan view showing a manually operable indexing rotary tool holder according to the present invention mounted on the turret of a turret lathe in an operative position adjacent a rotating workpiece;

FIG. 2 is a sectional view taken along line 2—2 of FIG. 1;

FIG. 3 is an enlarged sectional view taken along line 3—3 of FIG. 1;

FIG. 4 is a sectional view taken along line 4—4 of FIG. 3;

FIG. 5 is a sectional view of an alternate embodiment of the present invention showing the indexing rotary tool holder adapted for automatic operation;

Figure 6:
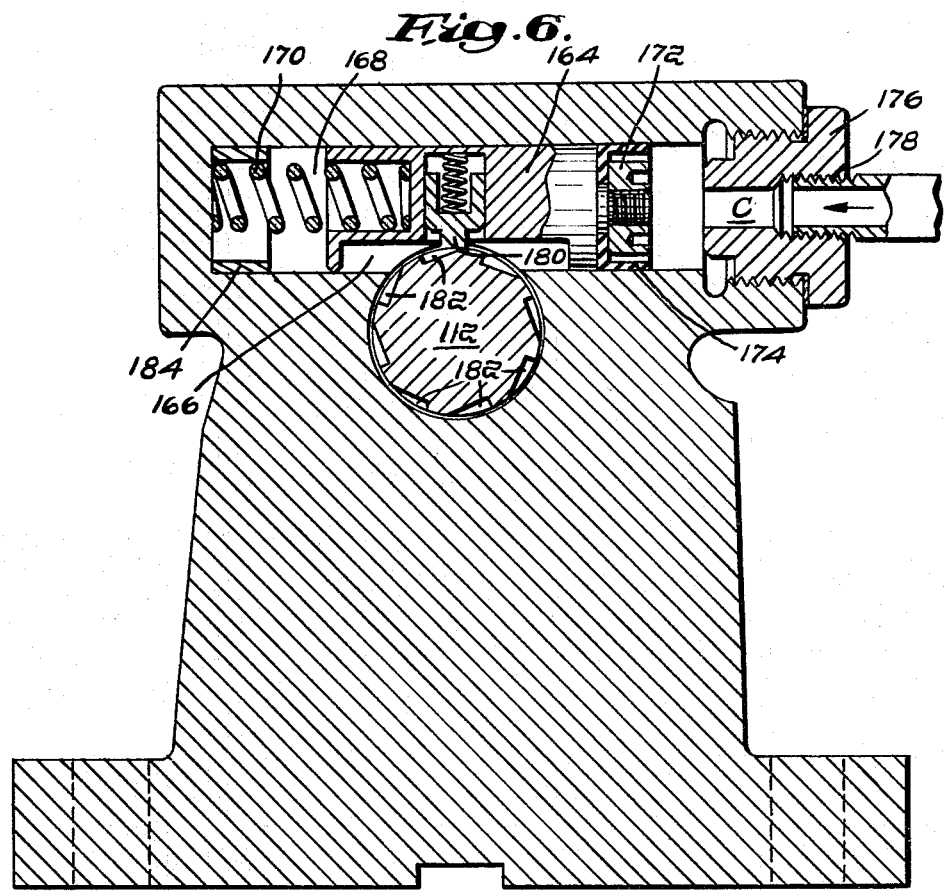
FIG. 6 is a sectional view taken along line 6—6 of FIG. 5.

Referring initially to FIGS. 1 and 2 wherein are best shown general features of the present invention, a portion of a conventional turret lathe installation is shown including the lathe cross slide 10 with a square turret assembly generally indicated by the reference numeral 12 fixed thereon by means of retaining bolts 14. A workpiece 16 is mounted in the lathe chuck 18 for a thread cutting operation.

The square turret assembly 12 is of conventional design having spaced upper and lower tool retaining plates 20 and 22. Both plates are designed to rotate about a central shaft 24 under the influence of a manually operable indexing handle 26. A conventional cutter 28 is shown operatively mounted in the usual manner on lower tool retaining plate 22 by means of vertically disposed tool retaining studs indicated typically by the reference numeral 30. The normal practice is to mount four of these tools in positions extending outwardly from each corner of the square turret lathe, thereby providing what is commonly referred to as a "four station operation." By operating indexing handle 26 and the various control mechanisms designed to control the movement of crossed slide 10, an operator can perform a wide range of cutting operations on a workpiece clamped between the jaws of chuck 18.

It should, however, be noted that in conventional installations of the aforementioned type where four cutting tools are mounted on a square turret, an operator is frequently placed at a disadvantage where additional tools would be required to satisfactorily perform the cutting operation. Moreover, as the tools become worn they must be individually replaced. This in turn necessitates a complete resetting if the cutting operation is to be performed in a consistent manner on each succeeding workpiece. During this resetting operation, the lathe must remain inoperative, thereby resulting in a considerable waste of valuable production time.

These difficulties have to a considerable extent been overcome by mounting individual tools on an improved indexing rotary tool holder hereinafter referred to in the drawings by the reference numeral 32. For purposes of discussion, the following description of the rotary tool holder will be presented in connection with a turret lathe having a square turret assembly 12. It is to be understood, however, that the association of the present invention with this particular type of conventional apparatus is intended only as one of many illustrations of its use and the advantages gained therefrom, and is not to be considered as a limitation upon the inventive concepts hereinafter disclosed and claimed.

Referring initially to FIGURES 3 and 4, rotary tool holder 32 is shown comprising an outer cylindrical housing 34 having an integrally fabricated mounting stub 36 extending outwardly therefrom. As shown in FIGURES 1 and 2, when the rotary tool holder is utilized with the square turret of a turret lathe, the mounting stub 36 may be held between upper and lower retaining plates 20 and 22 by means of tool retaining studs 30 in much the same manner as a conventional cutter 28.

Housing 34 is bored centrally to form an axial passageway 38 accepting a central rotatable shaft 40. Shaft 40 is shown in the present embodiment having a tapered portion 42 of gradually enlarging diameter bearing against the adjacent beveled surface 44 of passageway 38. The forward end of shaft 40, hereinafter designated by the reference numeral 46, is adapted to receive a removable rotary tool head 48 having a generally annular shape. As can be seen in FIGURE 2, rotary tool head 48 is provided with a series of radially disposed notches within which are mounted individual tool members indicated typically by the reference numeral 50. As herein illustrated, rotary tool head 48 is designed to provide a ten station operation by accepting ten individual tool members 50. It should, however, be understood that this number may be varied without departing from the spirit and scope of the invention.

Several significant advantages result from mounting individual tool members 50 in a radially disposed fashion on rotary tool head 48. More particularly, it is readily apparent that by so doing, an increased number of tool stations are made available to the operator. In addition, the replacement of a worn set of tool members with a newly-sharpened set is considerably facilitated. While the lathe is being continuously operated, a second identical set of tool members may be ground and preset on a second rotary tool head. When a change is necessitated, the first tool head is simply removed from shaft 40 by removing a single retaining bolt 52 which is threaded into the end of shaft 40. This permits quick changing of the rotary tool heads and thereby greatly decreases the amount of production time otherwise lost in replacing tool members individually mounted in a conventional manner on the square turret.

The indexing means comprising the manually-operated embodiment of the present invention will now be described with particular reference to FIGURES 3 and 4. The rear extremity of shaft 40, hereinafter referred to by the reference numeral 54, protrudes outwardly to the rear of cylindrical housing 34. An annularly-shaped indexing plate 56 is axially positioned on rear shaft extremity 54 and held for rotation therewith by means of a key member 58. The indexing plate is provided with a series of radially disposed indexing apertures 60, only two of which appear in FIGURE 4. As will hereinafter become apparent, the total number of indexing apertures 60 must be at least equal to the total number of tool members 50 extending radially from rotary tool head 48. The rear face of indexing plate 56 is provided with a countersunk enlargement 62 permitting a retaining ring 64 to be threaded on the end of shaft 40. When tightened, the retaining ring performs the dual function of holding the indexing plate 56 in place against the rear face of cylindrical housing 34 while exerting an axial force on shaft 40 tending to seat tapered portion 42 against the inner beveled surface 44 of axial passageway 38. Once retaining ring 64 has been sufficiently tightened, a split locking washer 66 is positioned against the rear end of shaft 40 and wedged against the inner diameter of retaining ring 64 by means of a screw 68 threaded into the end of shaft 40. With this arrangement, indexing plate 56 is held securely in place on the rear end of shaft 40 for rotation therewith.

Housing 34 is further provided with a second longitudinal passageway 70 extending substantially parallel to passageway 38 and suitably positioned to register with indexing apertures 60 as indexing plate 56 is rotated with shaft 40. An indexing pin 72 is slidably contained within passageway 70 and provided with an integral shoulder 74. A coiled spring 76 surrounds pin 72 and is contained within passageway 70 between shoulder 74 and a guide bushing 78. In view of the above, it can be seen that pin 72 is "spring loaded" and constantly urged towards indexing plate 56. When an indexing aperture 60 arrives in registration with passageway 72, the pin is immediately seated therein.

Shaft 40 is additionally provided between outer cylindrical housing 34 and rotary tool head 48 with an annular collar 80 axially mounted for rotation thereon. As can be best seen in FIG. 3, the collar is provided with an arcuate slot 82 machined to provide an enlarged groove 84 of gradually tapered depth. By varying the depth of groove 84, cammed surfaces 86 are provided along the base thereof. As shown in the drawings, one end of pin 72 extends through arcuate slot 82 in collar 80 to terminate in an enlarged head 88 contained within groove 84 and seated against cammed surface 86 by the compressive action of spring 76 exerted on shoulder 74.

Collar 80 is further provided with a radially disposed passageway 90 having threaded therein the lower extremity of an operating handle 92. The operating handle is in turn provided at its lower end adjacent collar 80 with an axially disposed passageway 94 containing a small diameter coiled spring 96 which acts to exert a downward force on a plunger member 98. Plunger 98 is designed to extend through collar 80 to seat itself within one of a plurality of stepped peripheral notches 100 machined into the outer cylindrical surface of central shaft 40. The notches provide a series of radially extending pointed shoulders indicated typically by the reference numeral 102 which cooperate with the plunger member 98 in providing a ratchet mechanism for rotating shaft 40 within housing 34 in a predetermined indexed sequence.

Having thus described the principal components of the manually-operated rotary tool holder, its operational sequence will now be reviewed. With operating handle 92 positioned as shown in the drawings, collar member 80 is located on shaft 40 with indexing pin 72 seated in the upper extremity of arcuate slot 82. This represents the rearmost rotational adjustment of handle 92 in a clockwise direction and results in the indexing assembly being placed in a locked position. More particularly, at this point the head 88 of indexing pin 72 is located in the deepest part of groove 84, and as a result is seated against the lowest part of cammed surfaces 86. At the same time, the other end of pin 72 is seated within an indexing aperture 60 in indexing plate 56. This prevents rotation of both the indexing plate and the shaft 40, thereby locking the radially disposed tools in place and permitting use of an individual tool, as for example that indicated by the reference numeral 50a in FIG. 1, during a particular phase in the thread cutting operation being utilized for purposes of illustration.

When the next adjacent tool 50b is to be utilized, the following sequence is followed: operating handle 92 is pushed forward to rotate collar member 80 in a counter-clockwise direction. During approximately the first 18° of rotation, plunger member 98 travels over the relatively flat surface of the underlying stepped notch 100 without mechanically engaging a radially extending pointed shoulder 102. While this is occurring, the cammed surfaces 86 of enlarged groove 84 are operating on the enlarged head 88 of indexing pin 72 to retract the pin into passageway 70 against the compressive force of spring 76. This results in the end of the indexing pin being withdrawn from registration with the aligned indexing aperture 60 in indexing plate 56. The apparatus is so designed that as the withdrawal of indexing pin 72 from indexing aperture 60 is completed, the spring-loaded plunger 98 will simultaneously engage the raised shoulder 102 of an underlying stepped notch 100. Thereafter, the handle will continue to be rotated in a counterclockwise direction through a further angular displacement of approximately 18° or until the enlarged head 88 of indexing pin 72 engages the other end of groove 84.

Due to the mechanical engagement of spring plunger 98 with a raised shoulder 102 on shaft 40, the entire assembly of rotary tool head 48, shaft 40 and indexing plate 56 are rotated in unison through the last 18°. This in turn results in the next adjacent tool member 50b (see FIG. 2) being placed in an operative position adjacent workpiece 16 and at the same time, places the next adjacent indexing aperture 60 in registration with the end of indexing pin 72. With this accomplished, the operating handle 92 is then rotated in a reverse clockwise direction. During the backstroke, spring plunger 98 will simply slide over the relatively flat surface of the next underlying stepped notch without any resulting mechanical engagement. As this occurs, the cammed surfaces 86 of notch 84 will be rotated to their original position, allowing indexing pin to be reinserted into the opposed indexing aperture 60 in indexing place 56 under the influence of coiled spring 76. During the backstroke, rotation of shaft 40 is prevented by means of a spring-loaded plunger mechanism 104 designed to cooperate with a series of shallow peripheral notches 106 on the circumference of the shaft in exerting a temporary holding action.

In view of the above, it can now be seen that a positive indexing sequence is provided by the apparatus described. This permits sequential presentation of a plurality of tool members to the operative position adjacent the workpiece and at the same time insures a positive locking action during performance of the cutting operation. When the tools become worn, the operator need only remove retaining bolt 52 when replacing one rotary tool head with a second head having mounted therein a second set of sharpened preadjusted cutting tools.

FIGURES 3 and 4 illustrate an alternate embodiment of the invention adapted for automatic operation. A stationary housing 108 is again provided with a contral passageway 110 within which is rotatably mounted a central shaft 112. The shaft is provided with an enlarged diameter portion 114 having a tapered surface 116 seated against the matching tapered surface of a bearing insert 118. The rear extremity of shaft 112 is journaled within a second bearing member 120 and protrudes outwardly from housing 108. An indexing plate 122 having a plurality of radially disposed indexing apertures 124 located therein, only two of which appear in FIGURE 5, is slidably mounted on the rear end of shaft 112 and keyed thereto as at 126 for rotation therewith. The indexing plate is held on shaft 112 by means of a threaded retaining ring 128, split lock washer 130 and a wedging screw 132 in much the same manner as previously described in connection with the manually-operated embodiment.

The other end of the shaft 112 is provided with two outwardly extending key members 134 attached thereto on either side of a reduced diameter shaft extension 136 by means of short screws 138. Key members 134 provide a means of locating and retaining the removable rotary tool head 140 which is axially inserted over shaft extension 136. The rotary tool head 140 is fixed against the shoulder 142 formed between enlarged shaft diameter portion 114 and the front reduced diameter shaft extension 136 by means of a plurality of retaining studs 144.

Rotary tool head 140 is provided with a plurality of individual tool members 148 attached by any conventional means to extend radially therefrom. The number of indexing apertures 124 in indexing plate 122 will again be at least equal to the number of tool members 148 to be utilized during the cutting operation. To the extent now described, the automatically operable embodiment is basically indentical to the previously described manually operated apparatus. The differences between the two forms of the invention will now become apparent as the indexing means and ratchet means utilized in automatically rotating the rotary tool head are further described.

As can be best seen in FIGURE 5, an indexing pin 150 is again positioned for reciprocal movement within a second reduced diameter passageway 152 extending through housing 108 in substantially parallel relationship to central passageway 110. Passageway 152 is initially subdivided into inner and outer compartments by the base portion 154 of a tubular insert 156 through which pin 150 extends. One end of pin 150 is suitably shaped as at 158 for insertion into a indexing aperture 124 in plate 122. The other end of the pin terminates in an enlarged portion forming a piston 160 which separates the inner compartment of passageway 152 to the rear of base portion 154 into two chambers A and B. Both piston 160 and the base portion 154 are provided with suitable sealing rings 161 and 162 which permit reciprocal movement of the piston 160 and pin 150 without leakage of operating fluid. Conventional valve means are provided for alternately introducing and exhausting pressurized fluid from chambers A and B in order to impart reciprocal motion to piston 160 and thereby cause the forward end 158 of indexing pin 150 to be either extended or retracted from engagement with indexing apertures 124 in the indexing plate 122.

As can best be seen from a combination of FIGURES 5 and 6, the central shaft 112 is sequentially rotated in one direction by means of a second horizontally disposed piston 164 slidably contained within a passageway 166 extending transversely to shaft 112. Piston 164 is provided at its forward end with an axial chamber 168 containing a coiled spring 170. The other end of piston 164 terminates in a piston head 172 suitably provided with sealing rings 174 which prevent pressurized fluid from bypassing. A plug connector 176 closes the otherwise open end of passageway 166 to provide a chamber C and provides a means as at 178 for connecting a source of pressurized fluid thereto.

The piston 164 is further provided at its intermediate point with a spring-loaded pluger 180 positioned to engage peripheral stepped notches 182 on shaft 112. The plunger 180 and notches 182 combine to form a ratchet assembly operating in a manner similar to that disclosed in connection with the manually-operated embodiment.

When operating the automatic apparatus, the following sequence is followed: a pressurized fluid, as for example air, is injected into chamber B to retract indexing pin 150 from engagement with a registered indexing aperture 124 in indexing plate 122. Thereafter, pressurized air is injected into chamber C at the rear of piston head 172 to advance piston 164. This causes spring plunger 180 to engage the raised shoulder of an underlying stepped notch 182 with the result that a shaft 112 is rotated in a counterclockwise direction through a predetermined angular displacement. As piston 164 is advanced, spring 170 is compressed until the end of the piston engages sleeve member 184 serving as a stop. Air pressure is then released from chamber B and injected into chamber A to lock indexing pin 150 into the next adjacent indexing aperture 124 which has been brought into registration therewith by aforementioned rotation of shaft 112. Thereafter, the air pressure is released from chamber C thereby allowing spring 170 to return piston 164 to its original position. The aforementioned sequential application of air pressure to the apparatus can be controlled by any known means to achieve completely automatic operation.

Having thus described the principal components of both the manually and automatically operable embodiments of the invention, the advantages derived therefrom will now be reviewed. To begin with, by mounting individual tool members in a radially disposed fashion on a rotary tool head, a multistation operation can be achieved which gives the operator a greater range of flexibility in the performance of his work. The fact that the rotary tool heads are interchangeable is also of importance in that it permits quick replacement of worn tools with an absolute minimum loss of valuable production time.

Still further, the particular indexing mechanism provides a compact, accurate means of sequentially advancing the individual tool members to an operative position adjacent the workpiece and for thereafter holding them in locked engagement during the cutting operation. This is accomplished with a minimum aggregation of components, thereby providing an apparatus which is both relatively inexpensive to manufacture and capable of long periods of continuous operation without frequent maintenance.

It is our intention to cover all changes and modifications of the invention herein chosen for purposes of disclosure which do not depart from the spirit and scope of the invention.

We claim:

1. A multistation indexing rotary tool holder for sequentially positioning tool members in an operative position adjacent a rotating workpiece, said tool holder comprising: a nonrotatable housing positioned for movement relative to said rotating workpiece; a central shaft rotatably contained within said housing; a rotary tool head removably mounted on one end of said shaft, said rotary tool head further provided with a plurality of said tool members extending radially therefrom; indexing means fixed to the other end of said shaft for rotation therewith relative to said housing, said indexing means comprised of a plate member having a plurality of indexing apertures located therein; locking means cooperating with said indexing means to prevent rotation of said shaft within said housing, said locking means comprising a pin member slidably contained within a passageway extending through said housing in parallel relationship to said shaft, one end of said pin seated within one of said indexing aperture in said plate member; means for disengaging said locking means from said indexing means comprising a collar member rotatably mounted on said shaft, said collar member provided with an arcuate slot opening into an enlarged groove of tapered depth, the base of said groove forming a cam surface, said pin member extending through said slot to terminate in an enlarged head seated against said cam surface, whereby when said collar is rotated about said shaft, said cam surface will bear against said head, causing said pin member to be retracted from engagement with an indexing aperture in said plate member; ratchet means for rotating said shaft through a predetermined angular displacement within said housing in order to place another of said tool members in said operative position adjacent said rotating workpiece, said ratchet means comprising peripheral notches in said shaft, said notches surrounded by said rotatable collar member, and a spring-loaded radially disposed plunger within said collar member, said plunger positioned to cooperate in one way engagement with said notches when said collar member is further rotated following disengagement of said locking means from said indexing means; and means for reengaging said locking means with said indexing means following the aforementioned rotation of said shaft within said housing.

2. The apparatus as set forth in claim 1 wherein said ratchet means is comprised of a series of peripheral stepped notches on said shaft, an extensible piston positioned adjacent said shaft and extending transversely thereto in the area of said notches, a spring plunger extending outwardly from said piston member for one way engagement with said notches, and means for extending and retracting said piston to cause rotation of said shaft.

3. A multistation rotary tool holder for sequentially positioning a plurality of tool members in an operative position adjacent a rotating work piece, said tool holder comprising the combination of: a nonrotatable housing positioned for movement relative to said work piece; a central shaft rotatably contained within said housing; a rotary tool removably mounted on one end of said shaft, said rotary tool head further provided with a plurality of said tool members extending radially therefrom; indexing means including a plate member fixed to the other end of said shaft for rotation therewith relative to said housing, said plate member having a plurality of indexing apertures radially disposed thereon, the number of said indexing apertures being at least equal to to the number of tool members mounted on said rotary tool head; locking means cooperating with said indexing means to prevent rotation of said shaft within said housing, said locking means including a pin member slidably extending through said housing in parallel relationship to said shaft, one end of said pin member seated in one of said indexing apertures; means for disengaging said locking means including a collar member rotatably mounted on said shaft between one end of said housing and said rotary tool head, said collar member provided with an arcuate slot opening into an enlarged groove of tapered depth, the base of said groove forming a cam surface, said pin member extending through said slot to terminate in an enlarged diameter head, seated within said groove against said cam surface, whereby when said collar is rotated about said shaft, said cam surface will bear against said enlarged head, causing said pin member to be retracted within said passageway out of engagement with the aligned indexing aperture in said plate member; ratchet means for rotating said shaft through a predetermined angular displacement in order to place another of said tool members in said operative position adjacent said work piece; and means for reengaging said locking means with said indexing means following the aforementioned rotation of said shaft within said housing.

4. Apparatus for sequentially positioning tool members in an operative position adjacent a rotating work piece comprising the combination of: a non-rotatable housing positioned for movement relative to said rotating work piece; a central shaft fixed against movement in an axial direction and rotatable within said housing; indexing means carried on one end of said shaft for rotation therewith relative to said housing; a rotary tool head removably mounted on the other end of said shaft, said rotary tool head adapted to have a plurality of radially extending tool members mounted thereon; locking means cooperating with said indexing means to prevent rotation of said shaft; operating means rotatable relative to said shaft; cam means on said operating means for disengaging said locking means from said indexing means when said operating means is rotated in one direction relative to said shaft, thereby freeing said shaft for rotation in the same direction relative to said housing; ratchet means for fixing said operating means relative to said shaft following disengagement of said locking means, the continued rotation of said operating means in said one direction thus causing said shaft and said indexing means to be correspondingly rotated; and, limit means on said operating means cooperating with said locking means to limit rotation of said operating means in said one direction, whereby upon rotation of said operating means in the opposite direction relative to said shaft, said locking means will be reengaged with said indexing means.

5. The apparatus as set forth in claim 4 wherein said indexing means is comprised of a plate member keyed to one end of said central shaft for rotation therewith, said plate member having a plurality of indexing apertures extending therethrough, the number of said indexing apertures being at least equal to the number of tool members mounted on said rotary tool head.

6. The apparatus as set forth in claim 5 wherein said locking means is comprised of a pin member slidably carried for axial movement by said housing, and spring means urging said pin member towards said plate member, thus causing one end of said pin member to be seated within indexing apertures in said plate member aligned axially with said pin member.

References Cited by the Examiner

UNITED STATES PATENTS 2,534,333 12/1950 Wyrick.
2,862,408 12/1958 Stirrett.
3,191,470 6/1965 Pabst et al.

FOREIGN PATENTS 712,521 10/1941 Germany.
740,491 11/1955 Great Britain.

WILLIAM W. DYER, Jr., *Primary Examiner.*
LEONIDAS VLACHOS, *Examiner.*